United States Patent
Lim et al.

(10) Patent No.: US 7,695,189 B2
(45) Date of Patent: Apr. 13, 2010

(54) SYSTEM TO CALIBRATE ON-DIE TEMPERATURE SENSOR

(75) Inventors: Chee H. Lim, Beaverton, OR (US); Jed D. Griffin, Forest Grove, OR (US); Kifah M. Muraweh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/178,884

(22) Filed: Jul. 24, 2008

(65) Prior Publication Data

US 2008/0304546 A1 Dec. 11, 2008

Related U.S. Application Data

(62) Division of application No. 11/476,948, filed on Jun. 28, 2006, now Pat. No. 7,417,448.

(51) Int. Cl.
*G01K 7/01* (2006.01)
(52) U.S. Cl. ............... 374/178; 374/171; 327/512; 702/130; 702/99
(58) Field of Classification Search ......... 374/171–173, 374/178, 1, 163, 183–185; 702/130–136, 702/99; 327/512–513; 257/470; 324/760
See application file for complete search history.

(56) References Cited

U.S. PATENT DOCUMENTS

| | | | | |
|---|---|---|---|---|
| 3,803,542 A * | 4/1974 | Longerich et al. | ............. | 367/94 |
| 4,912,423 A * | 3/1990 | Milkovic et al. | ............... | 330/9 |
| 5,764,467 A * | 6/1998 | Seo | ............... | 361/91.7 |
| 6,147,552 A * | 11/2000 | Sauer | ............... | 330/9 |
| 6,201,378 B1 * | 3/2001 | Eto et al. | ............. | 323/313 |
| 6,292,056 B1 * | 9/2001 | Hallen | ............... | 330/258 |
| 6,490,112 B1 * | 12/2002 | Ranmuthu et al. | ............. | 360/66 |
| 6,724,196 B1 | 4/2004 | Chiaro, Jr. et al. | | |
| 6,975,910 B1 * | 12/2005 | Brown et al. | ............. | 700/90 |
| 7,089,146 B1 * | 8/2006 | D'Aquino et al. | ............. | 702/132 |
| 7,150,561 B1 * | 12/2006 | D'Aquino et al. | ............. | 374/178 |
| 7,332,358 B2 | 2/2008 | Orr | | |
| 7,369,816 B2 * | 5/2008 | Kappes et al. | ............. | 455/73 |
| 2004/0066837 A1 * | 4/2004 | Armour et al. | ............. | 374/178 |
| 2005/0259718 A1 * | 11/2005 | Phan et al. | ............. | 374/178 |
| 2006/0203883 A1 * | 9/2006 | Griffin | ............. | 374/178 |
| 2008/0095213 A1 * | 4/2008 | Lin et al. | ............. | 374/170 |
| 2008/0259997 A1 * | 10/2008 | Gardner et al. | ............. | 374/170 |

FOREIGN PATENT DOCUMENTS

DE 19710829 A1 * 9/1998

* cited by examiner

*Primary Examiner*—Gail Verbitsky
(74) *Attorney, Agent, or Firm*—Buckley, Maschoff & Talwalkar LLC

(57) ABSTRACT

A system may include biasing of diodes of a temperature sensor disposed in an integrated circuit die using a current from an off-die current source, generation of a voltage based on the current and a temperature of the integrated circuit die, and determination of a first temperature based on the voltage. Such a system may further include amplification of the voltage using an oscillator and a chopper stabilizer, determination of a first amplified voltage associated with a first state of the oscillator and a second amplified voltage associated with a second state of the oscillator, and determination of a third voltage based on the first amplified voltage and the second amplified voltage, wherein determination of the first temperature based on the voltage comprises determination of the first temperature based on the third voltage.

5 Claims, 6 Drawing Sheets

SYSTEM TO CALIBRATE ON-DIE TEMPERATURE SENSOR

CROSS REFERENCE TO RELATED APPLICATION

This present application is a divisional of co-pending prior U.S. patent application Ser. No. 11/476,948, filed Jun. 28, 2006 and entitled "System to Calibrate on-die Temperature Sensor". The entire content of that application is incorporated herein by reference.

BACKGROUND

An integrated circuit (IC) die includes a semiconductor substrate and various electronic devices integrated therewith. It is often desirable to determine the temperature of these electronic devices during operation of the IC die. Conventional systems may determine the temperature using a temperature sensor integrated within the IC die.

An integrated temperature sensor may be calibrated to account for process and other variations. In a typical calibration procedure, the entire IC die is subjected to a known ambient temperature in an attempt to "soak" the temperature into the die. An output of the temperature sensor is then obtained, and a calibration factor is determined based on a difference between the ambient temperature and the output of the temperature sensor. Such calibration may result in inaccurate temperature measurements due to several factors, including a difference between the ambient temperature and the actual temperature of the die during calibration.

DETAILED DESCRIPTION

Figure 1:
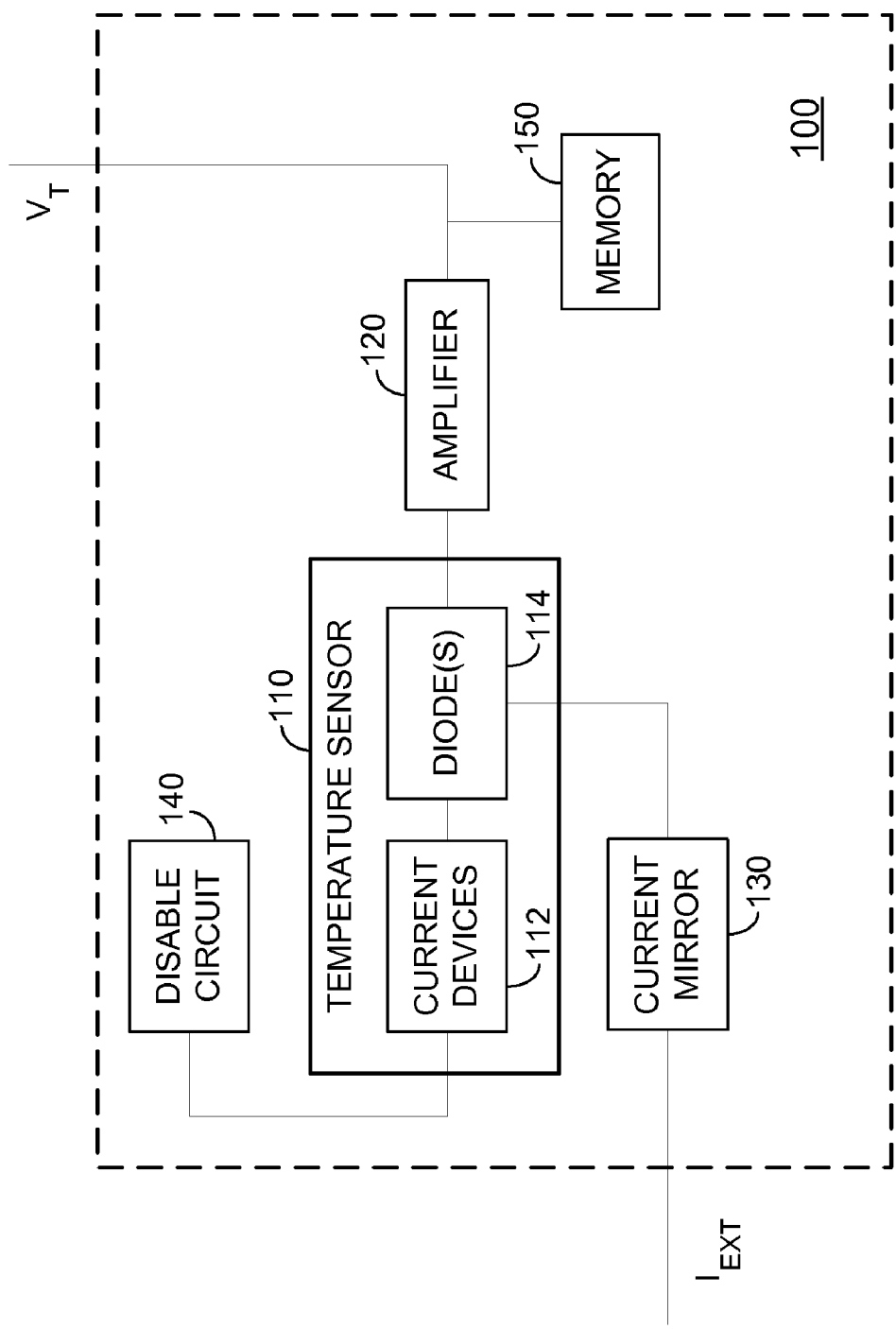
FIG. 1 is a block diagram of an IC die according to some embodiments.

FIG. 1 is a block diagram of IC die portion 100 according to some embodiments. IC die portion 100 includes integrated electrical devices and may be fabricated using any suitable substrate material and fabrication techniques. IC die portion 100 may provide one or more functions in addition to those described herein. In some embodiments, IC die portion 100 is a portion of a microprocessor die having a silicon substrate.

IC die portion 100 includes temperature sensor 110, amplifier 120, current mirror 130 and disable circuit 140. Temperature sensor 110 may operate to sense a temperature of IC die portion 100, and amplifier 120 may output the sensed temperature to an external system as voltage $V_T$. More specifically, current devices 112 of temperature sensor 110 may bias diode(s) 114, and a voltage associated with biased diode(s) 114 may be transmitted to amplifier 120. The voltage transmitted to amplifier 120 as well as voltage $V_T$ may have a known mathematical relationship to a temperature of IC die portion 100, therefore the temperature may be determined therefrom.

Current mirror 130, disable circuit 140 and memory 150 may operate during and after calibration of temperature sensor 110. According to some embodiments, disable circuit 140 may disable current devices 112 so as to prevent current devices 112 from biasing diodes 114. During such disabling, current mirror 130 receives current $I_{EXT}$ from an off-die current source (not shown) and biases diode(s) 114 using the current $I_{EXT}$. Depending on the configuration of current mirror 130, diode(s) 114 may be biased by current $I_{EXT}$ or by a known fraction or known multiple of current $I_{EXT}$.

As described above, amplifier 120 receives a voltage associated with biased diode(s) 114, and the voltage may be used to determine a temperature of IC die portion 100. The value of current $I_{EXT}$ and diode(s) 114 may be controlled to a high degree according to some embodiments. Therefore, the temperature determined according to the above-described calibration procedure may be more accurate than the temperature determined using current devices 112.

According to some embodiments, an ambient temperature surrounding IC die portion 100 is held constant while two temperatures are determined using the processes described above. A difference between the two determined temperatures is then determined and stored in memory 150. The stored difference may then be used to correct a temperature that is subsequently determined using current devices 112.

Figure 2:
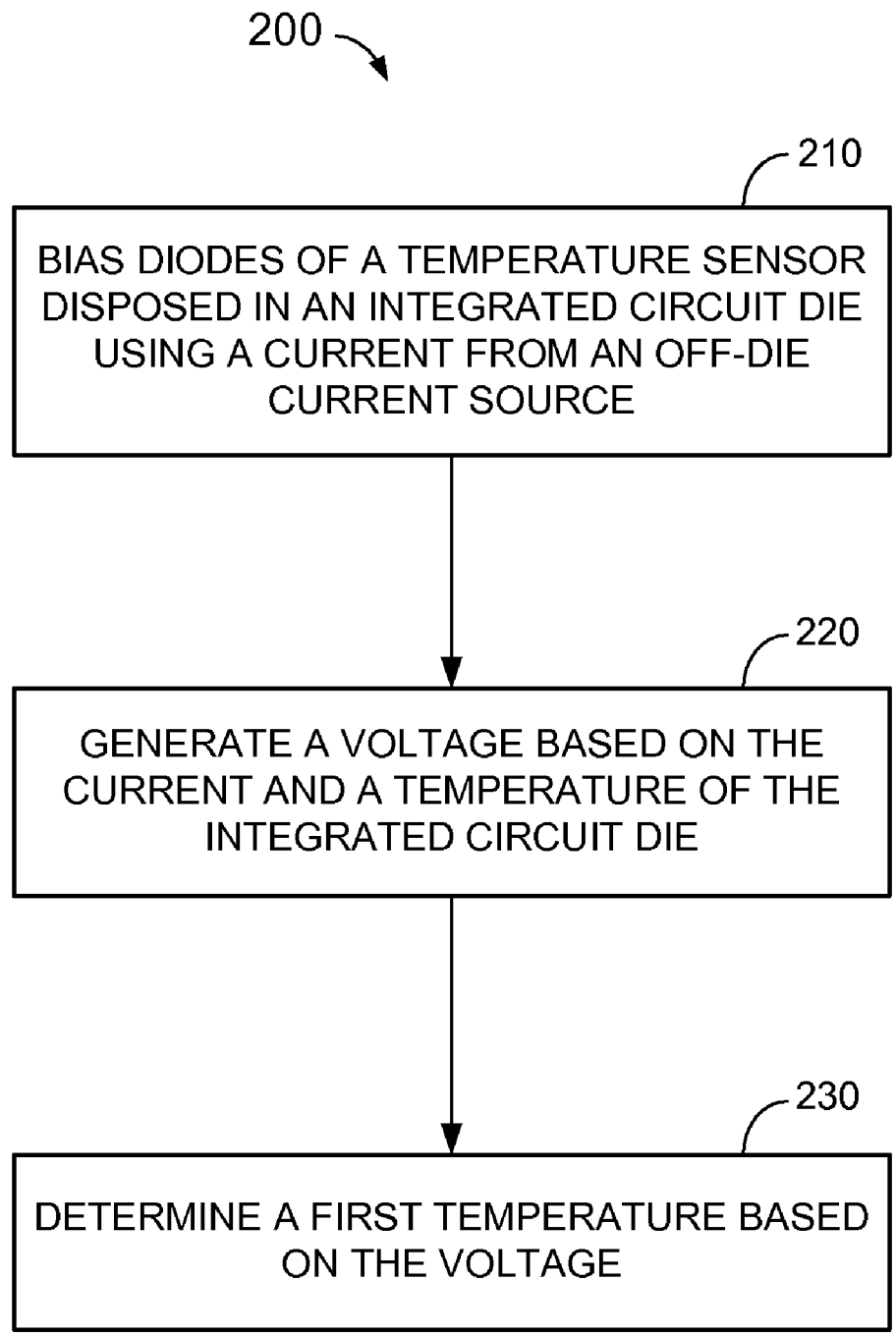
FIG. 2 is a diagram of a process to determine a temperature according to some embodiments.

FIG. 2 is a flow diagram of process 200 according to some embodiments. Process 200 may be used to determine a temperature of an IC die according to some embodiments. Process 200 may be implemented by any suitable combination of hardware, software, and firmware, including but not limited to implementations of IC die portion 100.

At 210, current from an off-die current source is used to bias diodes of a temperature sensor disposed in an IC die. Referring to the FIG. 1 example, current mirror 130 receives current $I_{EXT}$ from an off-die current source and biases diode(s) 114 using the current $I_{EXT}$ at 210.

Next, at 220, a voltage is generated based on the current and on a temperature of the IC die. The voltage may be generated by the biased diodes. In other words, the current is used to bias the diodes and a response of the diodes is influenced by a temperature of the IC die. Accordingly, a voltage generated by the diodes is based both on the received current and on the temperature of IC die portion 100.

A first temperature is determined based on the voltage at 230. According to some embodiments, the first temperature is determined based on a mathematical relationship between the current applied to the diodes, electrical characteristics of the diodes, and a temperature of the diodes. Since the applied current and the electrical characteristics may be known and controlled to a substantial degree, the first temperature may be determined more accurately and efficiently than in previous systems.

Figure 3:
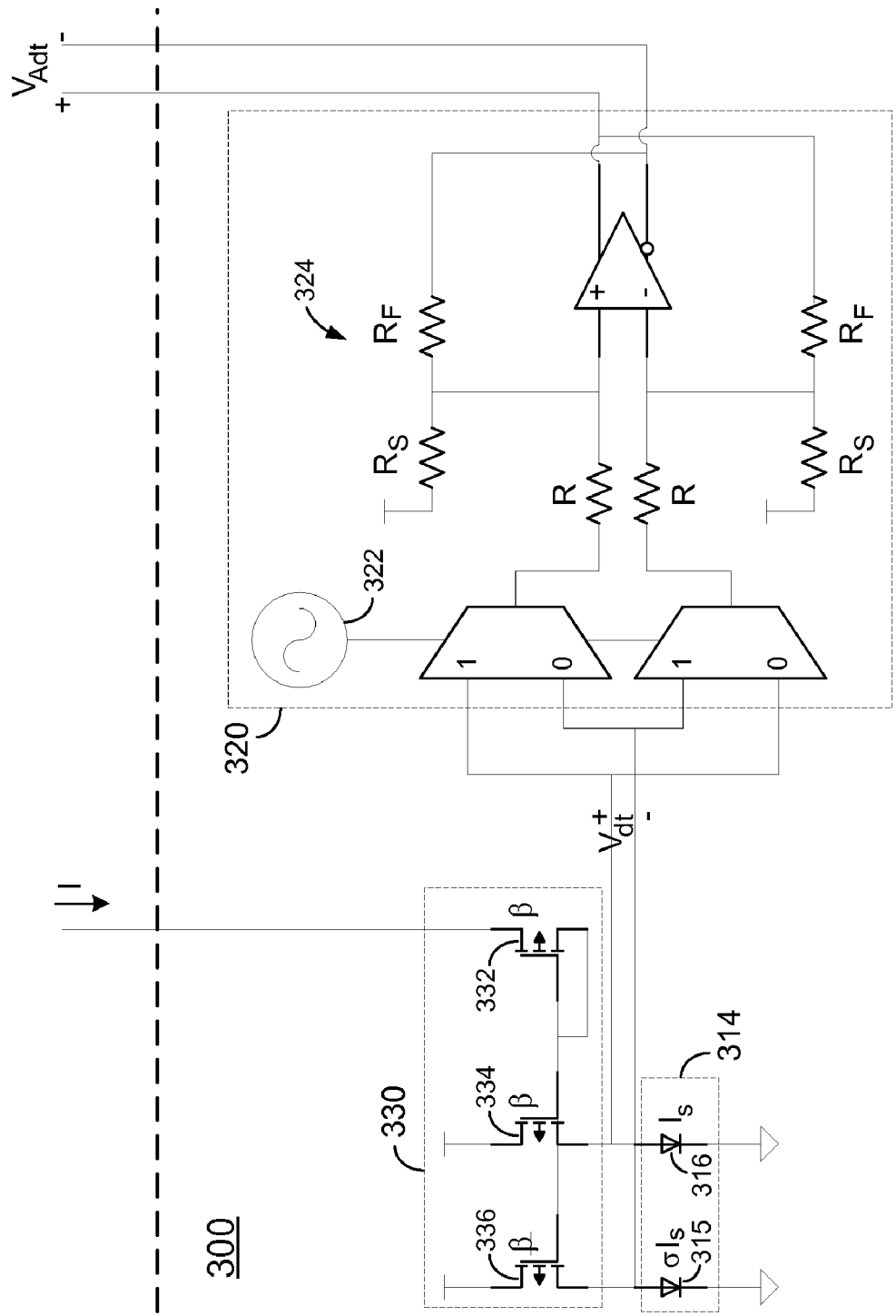
FIG. 3 is a schematic diagram of a calibration apparatus according to some embodiments.

FIG. 3 is a schematic diagram of a portion of IC die 300 according to some embodiments. IC die 300 includes diodes 314, amplifier 320 and current mirror 330. Diodes 314, amplifier 320 and current mirror 330 may comprise implementations of diode(s) 114, amplifier 120 and current mirror 130, respectively, of FIG. 1. Moreover, IC die 300 may also or alternatively implement process 200 according to some embodiments.

Current mirror 330 comprises p-channel metal-oxide semiconductor (PMOS) transistor 332 to receive current $I_{EXT}$ from an off-die current source. This current is mirrored by PMOS transistors 334 and 336 in proportions that depend on the relative sized of PMOS transistors 332, 334 and 336. Transistors 334 and 336 bias diodes 315 and 316 using the mirrored current. The resulting difference in voltage drops across diodes 315 and 316 is shown as voltage $V_{dt}$.

Voltage $V_{dt}$ is received by amplifier 320, which in turn generates voltage $V_{Adt}$. Amplifier 320 includes oscillator 322 and chopper stabilizer 324. In operation, oscillator 322 oscillates between two states (e.g., "1" and "0") at a relatively low frequency, causing chopper stabilizer 324 to output a first voltage $V_{Adt1}$ associated with a first state of oscillator 322 and a second voltage $V_{Ad2t}$ associated with a second state of oscillator 322.

A temperature T of IC die 300 may be determined based on the following equation:

$$T = \frac{R}{R_F}\left(\frac{q}{n\ln\sigma k}\right)V_{Adt},$$

where $V_{Adt}=|V_{Adt1}-V_{Ad2t}|/2$, k corresponds to Boltzmann's Constant, n corresponds to an ideality factor associated with diodes 314, and q corresponds to the charge of a electron. In some embodiments, n=1 for most IC fabrication technologies and n=2 for discrete components. Particular values used for the other variables may vary depending upon desired degrees of accuracy and/or preferred units.

Figure 4:
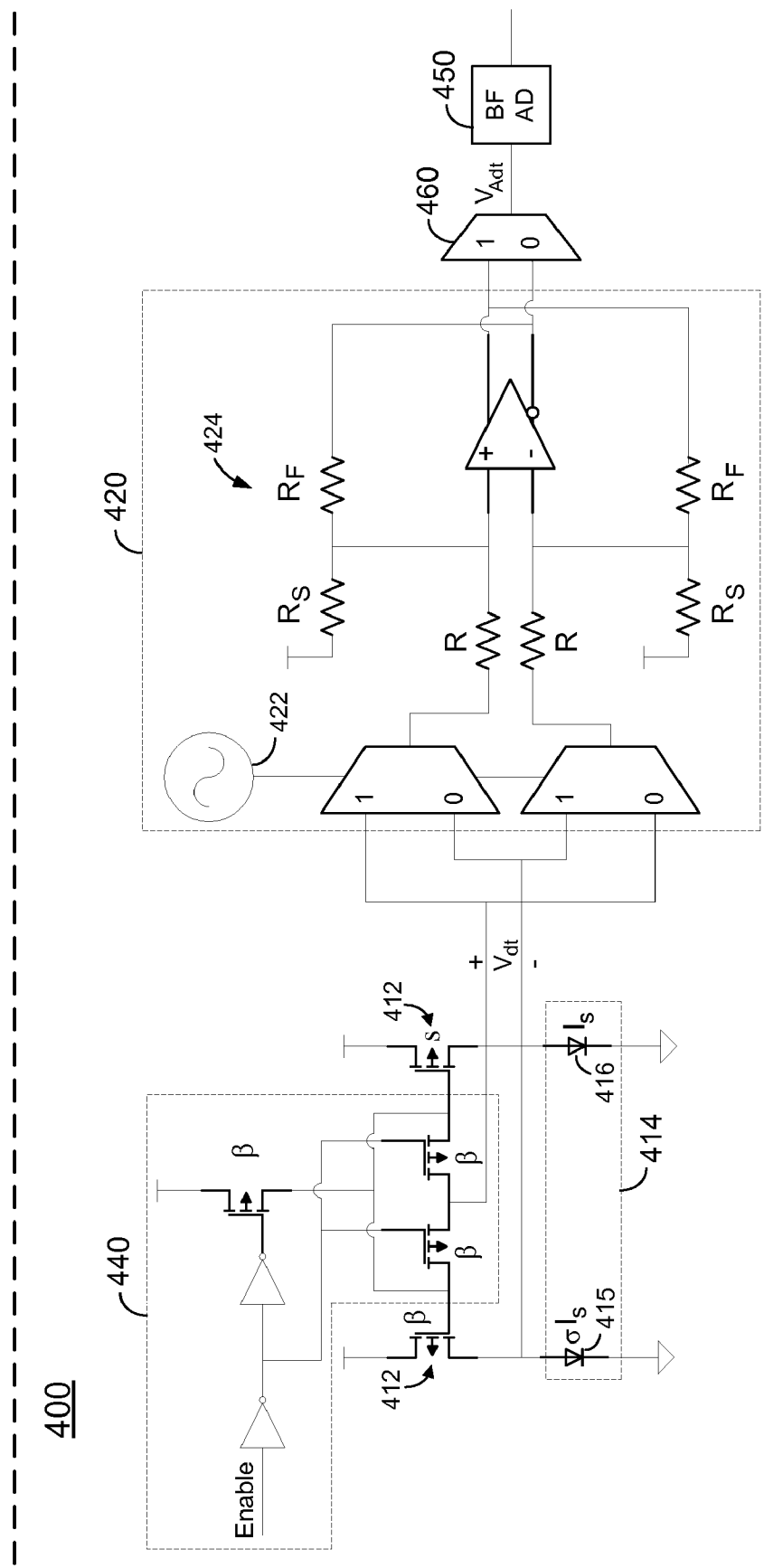
FIG. 4 is a schematic diagram of a measurement apparatus according to some embodiments.

FIG. 4 is a schematic diagram of a portion of IC die 400 according to some embodiments. IC die 400 includes current devices 412, diodes 414, amplifier 420, disable circuit 440, binary flash analog/digital converter 450 and multiplexer 460. Current devices 412, diodes 414, amplifier 420, disable circuit 440, and binary flash analog/digital converter 450 may comprise implementations of current devices 112, diode(s) 114, amplifier 120, disable circuit 140, and memory 150, respectively, of FIG. 1.

Disable circuit 440 may operate to enable or disable current devices 412 based on a received Enable signal. When enabled, current devices 412 bias diodes 414 and voltage $V_{dt}$ represents the resulting difference in voltage drops across diodes 415 and 416. Amplifier 420 receives voltage $V_{dt}$ and generates voltage $V_{Adt}$ based thereon. According to some embodiments, amplifier 420 alternately outputs a first voltage $V_{Adt1}$ and a second voltage $V_{Ad2t}$ to multiplexer 460 and multiplexer 460 outputs $V_{Adt}=|V_{Adt1}-V_{Ad2t}|/2$.

A temperature T of IC die 400 may therefore be determined based on the following equation:

$$V_{Adt} = \frac{R_F}{R}\left(\frac{n\ln\sigma sk}{q}\right)T + \frac{R_F}{R}\left(\frac{n\ln\sigma sk}{q}\right)273.15 - \frac{R_F}{R_s}(V_{DD}),$$

where $V_{Adt}=|V_{Adt1}-V_{Ad2t}|/2$, k corresponds to Boltzmann's Constant, n corresponds to an ideality factor associated with diodes 414, q corresponds to the charge of a electron, and n=1 for most IC fabrication technologies and n=2 for discrete components.

According to some embodiments, IC die 300 and IC die 400 are a same die, and temperatures are determined as described above while the die is maintained in a substantially constant ambient temperature. Moreover, a difference is determined between the two determined temperatures and the difference is used to correct temperatures that are subsequently-determined by the elements of FIG. 4.

In some embodiments, a single amplifier is used for both types of temperature determination described above. For example, element 330 of FIG. 3 may be connected to a single amplifier and diodes and disposed in parallel with elements 412 and 440 of FIG. 4, which are also connected to the single amplifier and diodes.

Figure 5:
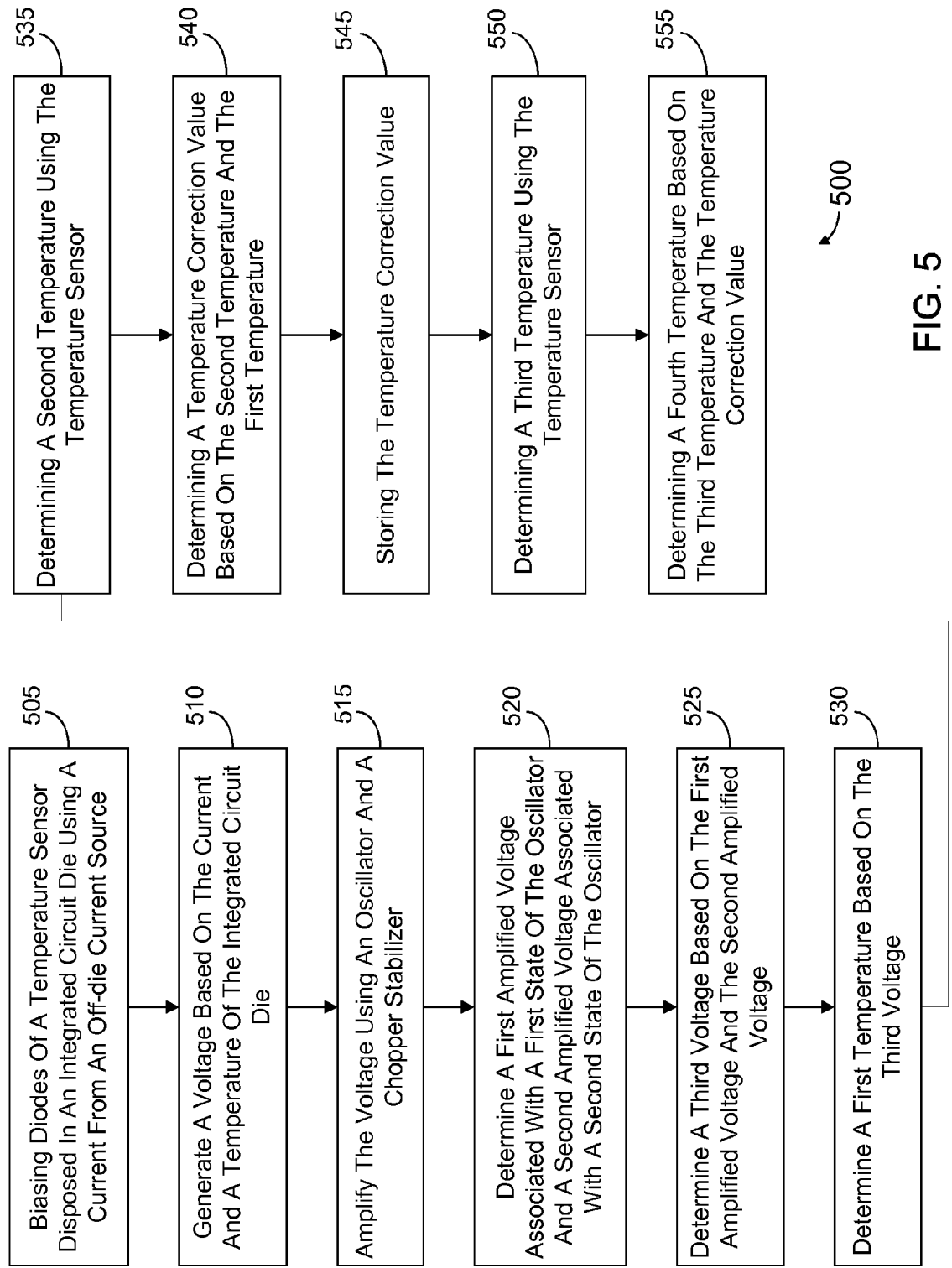
FIG. 5 is a diagram of a process to determine a temperature according to some embodiments.

FIG. 5 is a flow diagram of process 500 according to some embodiments. Process 500 may be used to determine a temperature of an IC die according to some embodiments. Process 500 may be implemented by any suitable combination of hardware, software, and firmware, including but not limited to implementations of IC die portion 100, IC die 300 and IC die 400.

At 505, current from an off-die current source is used to bias diodes of a temperature sensor disposed in an IC die. Referring to FIG. 3, PMOS transistor 332 receives current $I_{EXT}$ from an off-die current source. The received current is mirrored by PMOS transistors 334 and 336 to diodes 315 and 316 in proportions that depend on the relative sized of PMOS transistors 332, 334 and 336. Assuming that elements 314 and 330 of FIG. 3 are disposed in parallel with elements 412, 414 and 440 as described above, 505 may also comprise disabling current devices 412 using the Enable signal.

Next, at 510, a voltage is generated based on the current and on a temperature of the IC die. The generated voltage may comprise the difference in voltage drops across diodes 315 and 316. This voltage is based both on the received current and on the temperature of IC die 300.

The generated voltage is amplified using an oscillator and a chopper stabilizer at 515. In the present example, voltage $V_{dt}$ is received and amplified by oscillator 322 and chopper stabilizer 324 of amplifier 320. In addition, a first amplified voltage associated with a first state of the oscillator and a second amplified voltage associated with a second state of the oscillator are determined at 520. For example, chopper stabilizer 324 outputs a first voltage $V_{Adt1}$ associated with a first state of oscillator 322 and a second voltage $V_{Ad2t}$ associated with a second state of oscillator 322.

A third voltage is determined at 525 based on the first and second amplified voltages. The third voltage $V_{Adt}$ may be equal to $|V_{Adt1}-V_{Ad2t}|/2$. The third voltage may be determined by on-die or off-die systems. An on-die or off-die system may determine a first temperature based on the third voltage at 530. According to some embodiments, the temperature is determined based on the equation provided above:

$$T = \frac{R}{R_F}\left(\frac{q}{n\ln\sigma k}\right)V_{Adt}.$$

A second temperature is determined using the temperature sensor at 535. As described above, the second temperature may be determined using the same diodes and amplifier as used in 505 through 520. As an example of such a case, disable circuit 440 may operate at 535 to enable current devices 412 based on a received Enable signal. Current devices 412 therefore bias diodes 414 and voltage $V_{dt}$ represents the resulting difference in voltage drops across diodes 415 and 416. Amplifier 420 may receive voltage $V_{dt}$ and generate voltage $V_{Adt}$ based thereon as described above. The third temperature T may therefore be determined at 535 based on the following:

$$V_{Adt} = \frac{R_F}{R}\left(\frac{n\ln\sigma sk}{q}\right)T + \frac{R_F}{R}\left(\frac{n\ln\sigma sk}{q}\right)273.15 - \frac{R_F}{R_s}(V_{DD}).$$

A temperature correction value is determined at 540 based on the second temperature determined at 535 and the first temperature determined at 530. According to some embodiments, the temperature correction value is substantially equal to a difference between the first and second temperatures. Determination of the correction value at 540, in some embodiments, assumes that an ambient temperature surrounding the IC die is substantially constant from 505 through 535.

The temperature correction value is stored at 545. For example, the first temperature may be 26.34 degrees Celsius and the second temperature may be 26.85 degrees Celsius. The temperature correction value may therefore be determined as 26.34−26.85=−0.51 according to some embodiments. In some embodiments of 545, the temperature correction value is burned into fuses or other Read Only Memory of the IC die.

At 550, a third temperature is determined using the temperature sensor. The third temperature may be determined as described above with respect to determination of the second temperature. A fourth temperature is then determined at 555 based on the third temperature and the stored temperature correction value. Continuing with the above example, the third temperature may be determined to be 28.45 degrees Celsius at 550, and the fourth temperature may be determined to be 28.45+(−0.51)=27.94 degrees Celsius at 550. In some embodiments, 505 through 545 occur prior to shipping the IC die to an end-user, and 550 through 555 occur during use of the IC die by the end-user.

Figure 6:
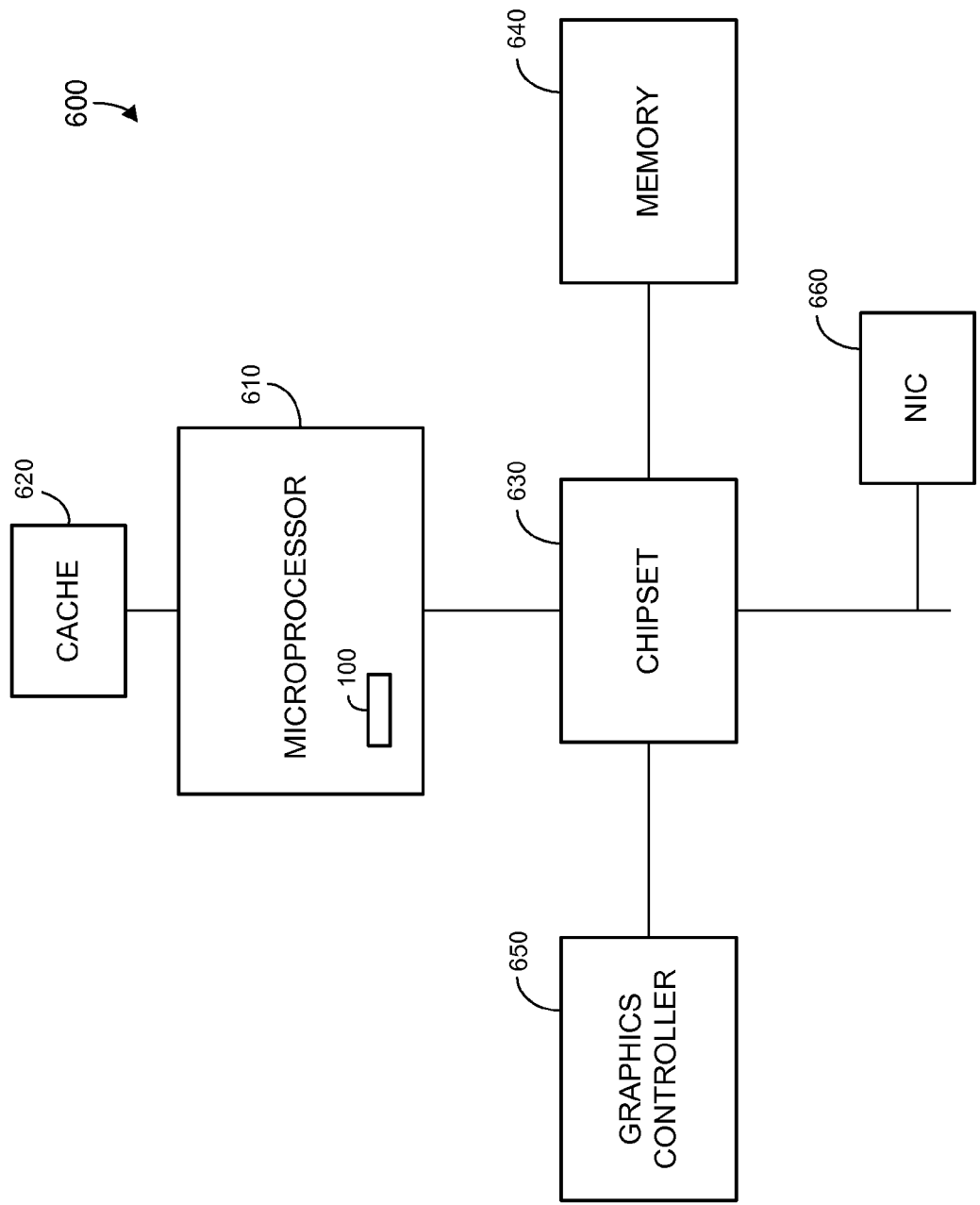
FIG. 6 is a diagram of a system according to some embodiments.

FIG. 6 illustrates a block diagram of system 600 according to some embodiments. System 600 includes microprocessor 610 comprising IC die portion 100 of FIG. 1. Microprocessor 610 communicates with off-die cache 620 according to some embodiments.

Microprocessor 610 may communicate with other elements via a host bus and chipset 630. Chipset 630 also communicates with memory 640, which may comprise any type of memory for storing data, such as a Single Data Rate Random Access Memory, a Double Data Rate Random Access Memory, or a Programmable Read Only Memory. Other functional units, such as graphics controller 650 and Network Interface Controller (NIC) 660, may communicate with microprocessor 610 via appropriate busses or ports.

The several embodiments described herein are solely for the purpose of illustration. The various features described herein need not all be used together, and any one or more of those features may be incorporated in a single embodiment. Some embodiments may include any currently or hereafter-known versions of the elements described herein. Therefore, persons skilled in the art will recognize from this description that other embodiments may be practiced with various modifications and alterations.

What is claimed is:

1. A method comprising:
   biasing diodes of a temperature sensor disposed in an integrated circuit die using a current from an off-die current source;
   generating a voltage based on said current and a temperature of the integrated circuit die;
   amplifying said voltage using an oscillator and a chopper stabilizer;
   determining a first amplified voltage associated with a first state of the oscillator and a second amplified voltage associated with a second state of the oscillator; and
   determining a first temperature based on a third voltage equal to one half of a difference between the first amplified voltage and the second amplified voltage.

2. A method according to claim 1, wherein biasing the diodes comprises:
   receiving the current at a current mirror; and
   outputting current from the current mirror to the diodes.

3. A method according to claim 1, further comprising:
   determining a second temperature using the temperature sensor; and
   determining a temperature correction value based on the second temperature and the first temperature.

4. A method according to claim 3, wherein the temperature correction value equals a difference between the second temperature and the first temperature.

5. A method according to claim 3, further comprising:
   storing the temperature correction value;
   determining a third temperature using the temperature sensor; and
   determining a fourth temperature based on the third temperature and the temperature correction value.

* * * * *